Nov. 13, 1956  A. T. FERRIS  2,770,219
MOBILE EXTENSIBLE TYPE RACE STARTING GATE
Filed Sept. 22, 1954  3 Sheets-Sheet 1
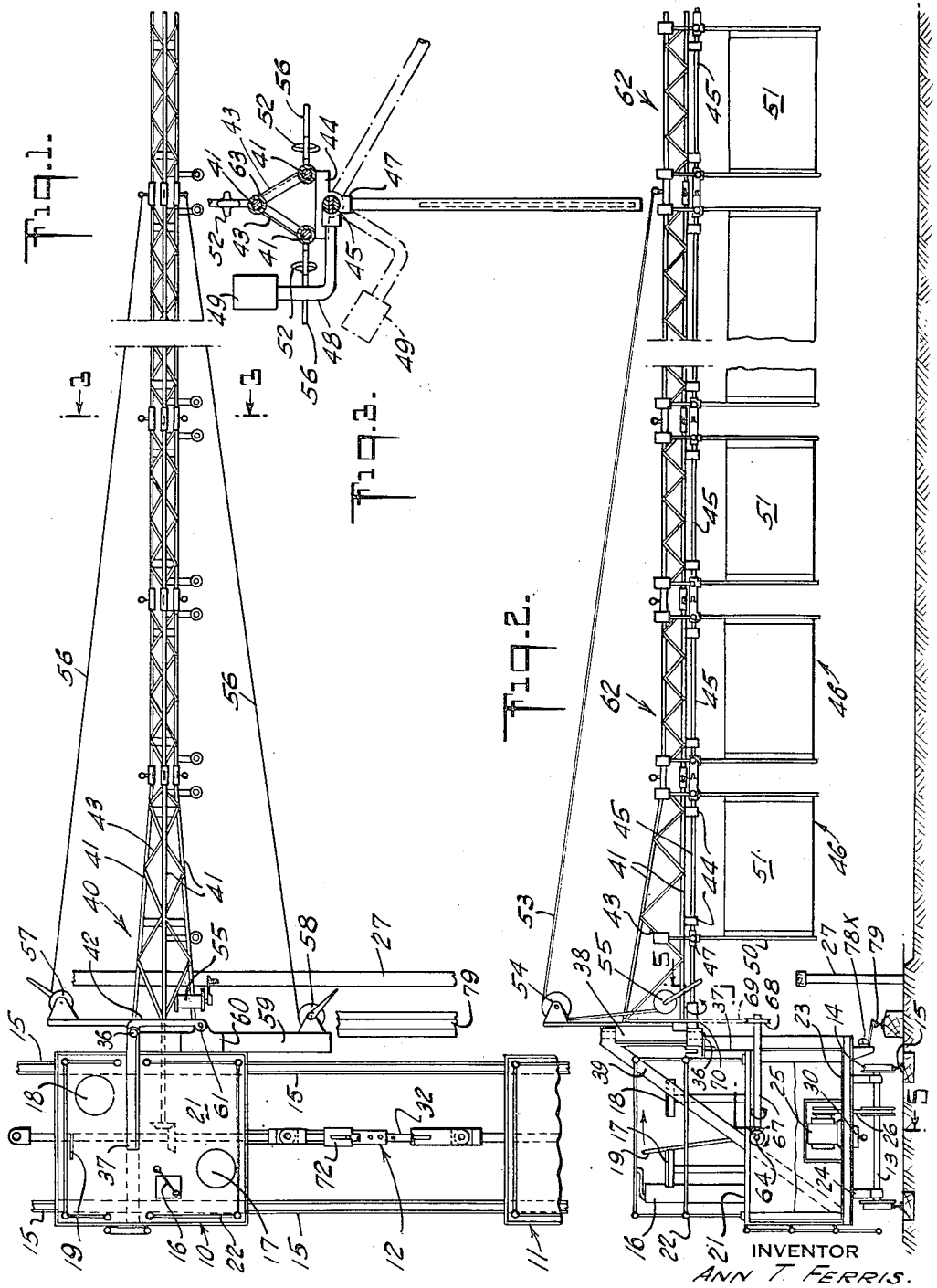
INVENTOR
ANN T. FERRIS.
BY
Frank Moskara
ATTORNEY Nov. 13, 1956  A. T. FERRIS  2,770,219
MOBILE EXTENSIBLE TYPE RACE STARTING GATE
Filed Sept. 22, 1954  3 Sheets-Sheet 2

INVENTOR
ANN T. FERRIS.
BY
Frank Maham
ATTORNEY

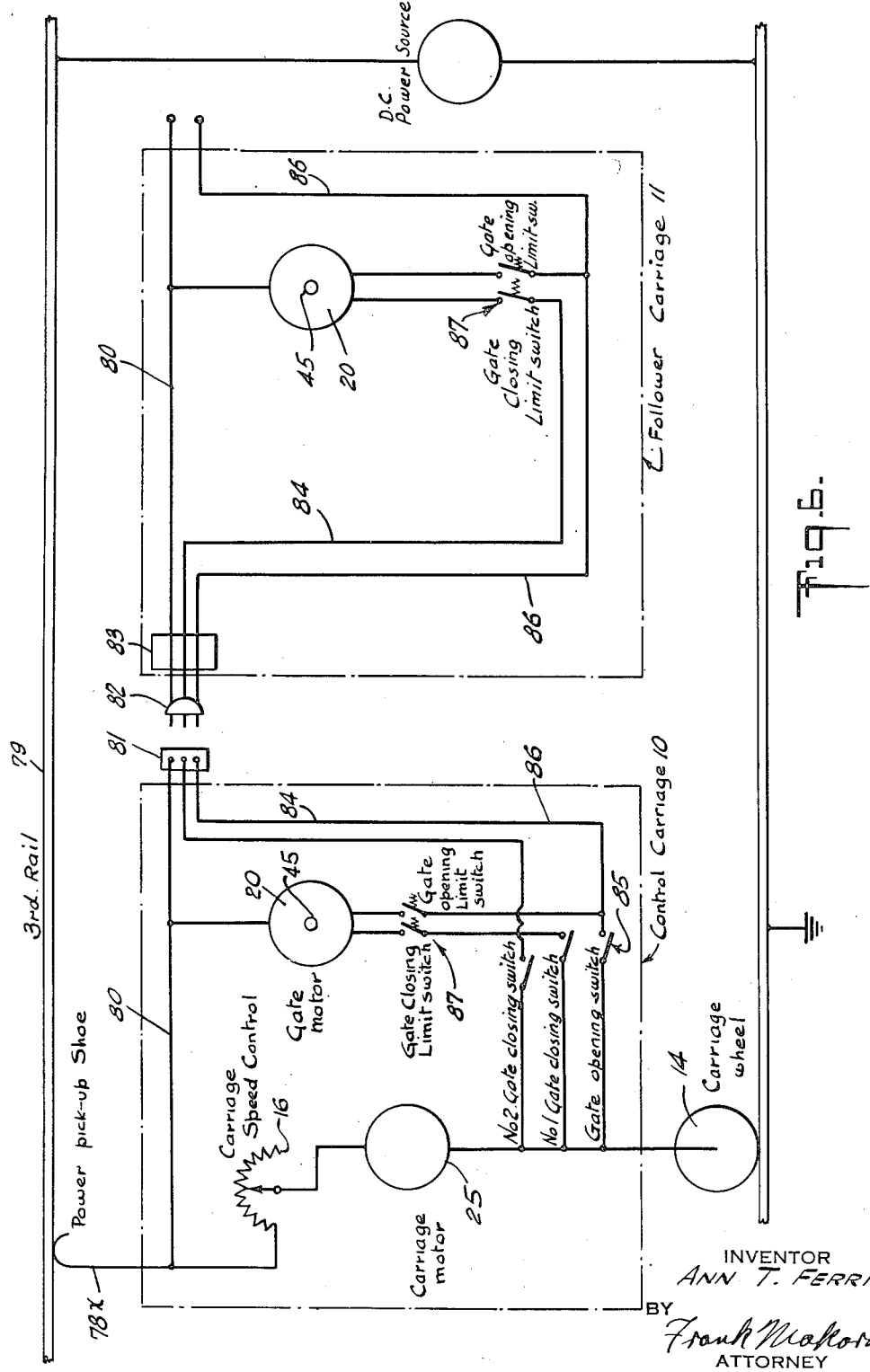

United States Patent Office 2,770,219
Patented Nov. 13, 1956

2,770,219

MOBILE EXTENSIBLE TYPE RACE STARTING GATE

Ann T. Ferris, New York, N. Y.

Application September 22, 1954, Serial No. 457,600

2 Claims. (Cl. 119—15.5)

This invention relates to starting gates for horse racing and more particularly for starting gates used for harness horse racing.

It is an object of this invention to provide a starting gate adapted to accommodate horses racing under handicap conditions.

It is another object to provide a starting gate which is easily manipulated and which will not frighten a horse during a running start.

It is a further object of this invention to provide a starting gate having a plurality of selective linear booms adapted to accommodate one or more horses.

It is still another object of this invention to provide a starting gate adapted to produce a running start for a plurality of horses disposed laterally and behind one another.

These and other objects of this invention will become apparent upon reading the following disclosure taken in conjunction with the accompanying drawing in which:

Fig. 1 is a top partial view of a linear boom of several boom sections attached to a starter carriage and showing the manner of hooking the starter carriage to a follower carriage the top boom supporting guy wire being omitted for the purpose of clarity.

Figure 4:
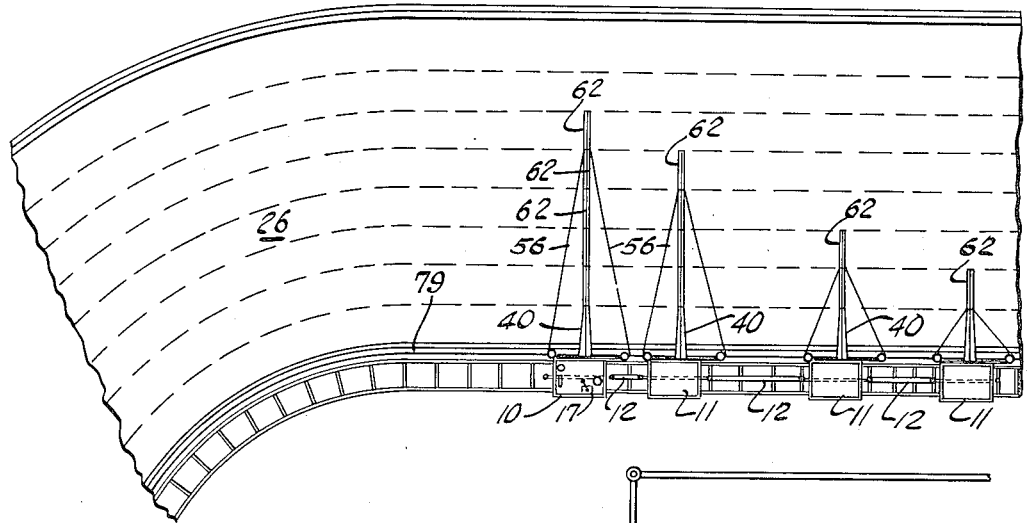
Figure 5:
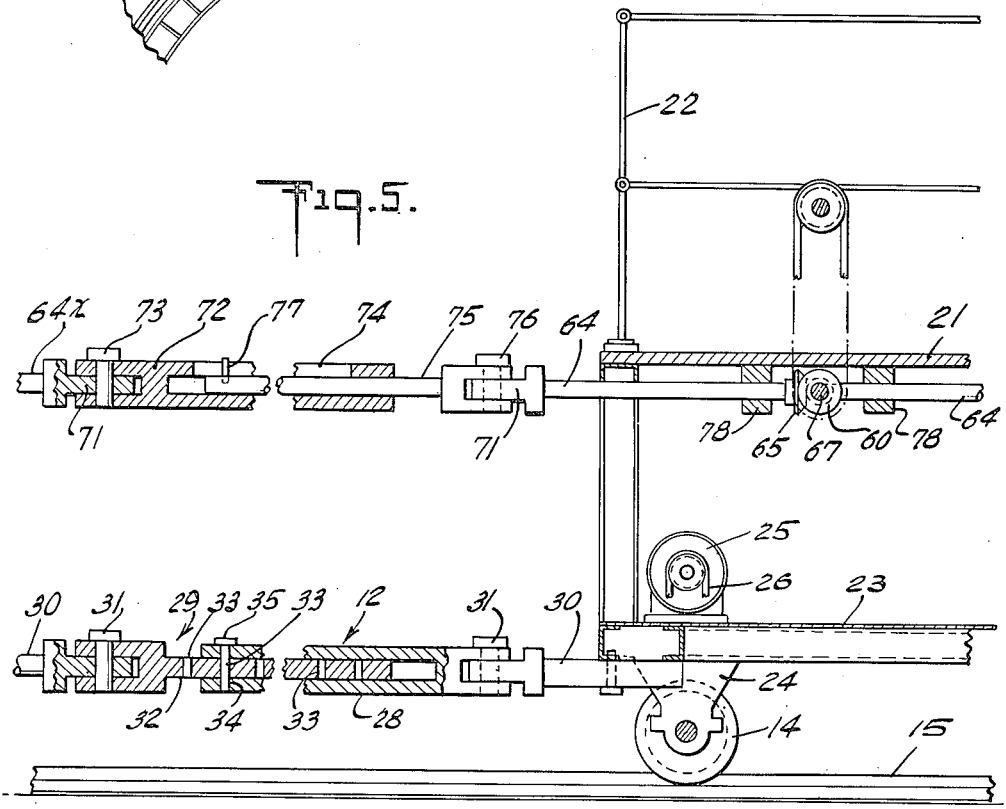

Fig. 2 is a side partial view of the gate of Fig. 1 and showing vertically disposed rectangular woven-web elements disposed adjacent to a horse's nose the forward and rear boom supporting guy wires being omitted for purposes of clarity, Fig. 3 is a view taken on line 3—3 of Fig. 1 and showing in dotted outline a web element in a partly raised position, Fig. 4 is a partial view of a race track showing a starter carriage and three follower carriages, said carriages being selectively spaced from one another to conform with the handicap of the various horses of the race and further showing a plurality of linear individual booms, composed of a plurality of selective linear boom sections to accommodate horses in lateral relationship, Fig. 5 is a view partly in cross-section, and taken on line 5—5 of Fig. 2 and showing the manner of effecting the selective distance between the carriages, and Fig. 6 is an electrical wiring diagram for electrical operation of the starter carriage and subsequent follower carriages as well as for operating all linear booms simultaneously.

Referring now to Figs. 1 to 3, a starter carriage or lead car 10 is hooked up to a follower carriage 11 by means of a selectively expansible connecting rod 12.

The starting and follower carriages are each provided with a pair of conventional axles 13 and a pair of flanged wheels 14 are secured to each axle. The wheels 14 are disposed upon a pair of spaced-apart rails 15.

The starter carriage 10 is provided with a rheostat 16 operated by an operator seated upon an operator's seat 17. A starter of the race is seated upon a starter's seat 18 and in close proximity to a manually operated starting lever 19 or a starting motor control 20 (Fig. 6) used in place of lever 19. The starting lever 19 is used to raise the individual starting gates disposed in front of each horse, described hereinafter.

The top platform 21 of each carriage is disposed about 6 feet above the ground and is enclosed in a pipe railing 22. A bottom carriage platform 23 is disposed over the axles 13 and secured thereto by depending supports 24. An operating motor 25 for operating the train of carriages is disposed preferably in only the starting carriage 10 and is connected to the rheostat 16. The motor 25 is adapted to rotate a shaft 13 by conventional means such as a belt drive 26. The space between the top platform 21 and the bottom platform 23 is filled with ballast of sand, gravel or the like.

The rails 15 are disposed interiorly of the oval race-track 26 and a guard rail 27 is disposed interiorly thereof.

The starter carriage 10 and each of the follower carriages 11 are connected together by means of a selectively adjustable connecting rod 12. The carriage 10 and each of the follower carriages 11 are thus adjustable a distance commensurate with the handicap of the horses disposed between the corresponding carriages.

Turning to Fig. 5, the connecting rod 12 may, for example, consist of a tubular rod 28 and a mating rod 29 adapted to slide firmly into the tube of rod 28. The tubular rod 28 is secured to a conventional coupling 30 secured to a carriage and the rod 29 is similarly hooked into another conventional coupling 30 secured to an adjacent carriage. The rods 28 and 29 are provided with horizontally disposed slots at their coupling ends and linearly disposed apertures are provided in the overlying and underlying rod segments of said slot, said apertures being adapted to receive a coupling pin 31 disposed therethrough and through a corresponding aperture in a coupling 30 section disposed in said slot. By this means the carriages can be swung around a curve since coupling pins 31 function as swivel pins when the tandemly disposed carriages are pulled around a curve.

The rod 29 is provided with a slide bar segment 32 which slides firmly into the tube of tubular rod 28, and it is further provided with a plurality of vertically disposed spaced-apart apertures 33, said apertures being spaced apart at suitable intervals. The tubular section of tubular rod 28 is provided with at least one vertically disposed aperture 34. A lock pin 35 is adapted to be disposed through a tubular rod aperture 34 and through a rod 28 aperture 33 disposed linearly thereto, thereby locking tubular rod 28 selectively to slide rod 29, thus providing a means for selectively adjusting the distance between carriages in conformity with the handicap selected.

A horizontal angle bar 36 is secured to an upright support plate 37 by welding. The plate 37 is in turn secured to the carriage by welding, bolts or other conventional means. An upright rotatable bar 38 having journaled ends of small diameter is disposed at its base is a suitable aperture in angle bar 36. The top journal end is disposed in a suitable diagonally disposed support bar 39. The support bar 39 traverses the top platform 21 and is secured by conventional means to the bottom platform 23 at its edge furthest removed from plate 37.

As shown in Figs. 1 to 3, a boom segment 40 consisting of three lateral rods or pipes 41 disposed in triangular relationship is secured to a vertical plate piece 42 disposed centrally and secured to rotatable bar 38 by, for example, welding or other conventional means. The boom segment rods or pipes 41 are rigidly secured together by bridge pieces 43 welded to said pipes 41.

A pair of bottom plates 44 are welded to the bottom pair of the three pipes 41 and are provided with depending lugs having apertures to receive a rotatable rod 45 (Fig. 3). The boom segment 40 is of about six foot length and thus adapted to accommodate a harness type race horse.

A rotatable individual gate assembly 46 is secured to each boom segment and is provided with a pair of right angle tubular elbow pieces 47 having screw-threaded apertured means adapted to receive sections of rotatable boom rod 45. One arm of the screw-threaded elbow piece 47 is provided with an upright L-shaped pipe 48 having a counter weight 49 secured to the elbow upright section. The other arm of each of the elbow pieces 47 is provided with a screw-threaded pipe 50 adapted to engage a stretched woven-web or netting 51, against which the nose of the race-horse is pressed. Each of the pipes 41 of each boom section 40 is provided with an eye bolt 52 disposed in outermost relationship to rotatable bar 38.

An over head guy wire 53 is secured to the eye bolt of the top pipe 41 of the triangular boom 40 and passed over a wench pulley 54 having a conventional ratchet wheel 55 for tightening the guy wire 53.

A forward and a rear lateral guy wire 56 are secured to the corresponding eye bolts of the corresponding bottom pipes 41. The forward guy wire 56 is secured to the forward edge of plate 42 by means of a ratchet-wrench 57. Similarly the rear guy wire 56 is secured to a ratchet-wrench 58 secured in turn to a support piece 59 carried by the carriage.

A lock-plate 60 is secured by welding or other conventional means to a support piece 59 and is provided with an aperture to receive a locking pin 61.

The plate 42 is provided with a lug having an aperture adapted to be linearly disposed over the aperture of lock-plate 60, whereby locking pin 61 locks the plate 42 and its boom segment 40 immovably to and at a right angle to the carriage. Each linear boom is made of one or more boom segments. Ordinarily for an eight lane race track up to eight individual starting gate or boom segments may be disposed in each linear boom attached to each carriage. More than eight individual boom segments are disposed transversely to a race-track, or at a right-angle relative to the longitudinal axis of the vehicle, so that with a correspondingly wide race track more than eight harnessed horses may be linearly started, if so desired.

A plurality of identical boom segments 62, somewhat similar to boom segments 40, each having three parallel pipes 41 constituting a triangular superstructure with cross-bridging 43 and all having a rotatable rod 45 disposed in a pair of support plates 44 and provided with elbows 47 and counterweights 49 are secured in linear relationship to the first boom segment 40 which has a sloping top pipe 41.

The boom segments 62 are connected to one another and to the boom segment 40 of a linear boom by means of slip-on collars 63 adapted to receive the free ends of the pipes 41 disposed laterally beyond the elbows 47.

The rod section 45 of each boom segment is provided at one end with a groove and at its opposite end with a tongue to fit the groove, thereby permitting subsequent consecutive rod sections 45 to be connected together and to transmit motion or rotational movement of the rod. Thus rotation of rod section 45 in boom segment 40, effects rotation of all rod sections 45 disposed in the added boom segments 62. Consequently, all nettings 51 in a linear boom are rotated upwardly simultaneously as a unit. As shown in Figs. 1 and 2 the guy wires 53 and 56 are extensible to the outermost boom segment 62 and upon being made tight by means of wenches 55 and 58, the entire linear boom becomes a rigid structure. The addition of a boom segment 62 to boom segment 40 or to other boom segments 62 is rapidly accomplished because of the slip-on collars 63 and the keying effect of the tongue and groove securing means disposed on the opposed ends of rod sections 45.

As shown in Figs. 1 and 5 the rotatable rod sections 45 may be mechanically rotated as a unit through an angle of 90 degrees by the starter of the race by pulling lever 19. The rods 45 may however be rotated by electrical means described hereafter.

In the manual operation of the rods 45 to rotate the netting 51 away from a running horse, a pull on the lever 19 causes the lever rod 64 to rotate. The rod 64 is provided with a conventional bevel gear 65 and a corresponding bevel gear 66 is disposed upon a lateral shaft 67. The shaft 67 (Fig. 2) is provided with an end sprocket wheel 68 and a sprocket chain 69 which chain engages a sprocket wheel 70 secured fixedly to rotatable boom rod 45. Manual pulling of the lever 19 in the direction of the arrow (Fig. 2) thus effects a simultaneous outward elevation of all support arms 50 with their corresponding netting 51.

Turning to Fig. 5, the lever rod 64 is provided with an apertured tongue 71. A corresponding rod 64X is located in each of the follower carriages 11 and are also provided with apertured tongues 71. A tubular end-slotted end-apertured rod 72 is secured to the lever rod 64X by a pin 73. The rod 72 is also provided with an aperture or slot 74 communicating with the tube thereof.

A slide bar 75 also having an end slot and an aperture in each of the slot forming elements is secured to the tongue 71 of lever rod 64 by a bolt 76. The slide bar 75 is disposed in the tube of rod 72 and a locking pin 77 is disposed in a cavity in rod 72 and then in the slot 74. Clearly lever rod 64 and its connecting slide bar assembly coupled to a successive lever rod 64X adjusts itself automatically to the distance selected by the connecting rod 12, and is adapted to transmit rotational movement since the overall assembly is journaled in a pair of support journals 78 disposed in each of the carriages. The connecting slide bar assembly disposed between lever rods 64 and 64X is thus pivotable to take curves in the same manner that is connecting rod 12.

As shown in Figs. 1 and 2 the starter carriage is electrically hooked up by conventional electrical means 78X to a third rail 79. In lieu of a third rail an over-head trolley may be used. Other means for motivating the train such as attaching to a moving tow cable or tow chain are operable.

The tracks 15 may be circuitous so that the train traveling in one direction will return to the starting position, or the track may be non-circuitous, in which latter event the train after effecting a running start comes to a stop, preferably by automatic power shut-off means, whereupon it is placed in reverse motion until it is returned to its original starting position.

Turning now to Fig. 6, a wiring diagram is presented schematically showing the manner of electrically operating simultaneously a gate motor 20 located on each of the carriages, whereby the rotatable rod 45 and the attached netting 51 assembly of all the linear booms are raised uniformly, simultaneously and through the same interval of time.

As shown in Fig. 6 the starter or control carriage 10 is provided with a conventional power pick-up shoe 78X in frictional contact with the third rail 79. The pick-up shoe is connected electrically to a rheostat 16 and thence to the starter carriage motor 25. A gate motor 20 is disposed in carriage 10 and each of the follower carriages 11. Electrical connections of conventional usage are provided for energizing the gate motors 20 of the starter carriage and all follower carriages from the power pick-up shoe.

A starter carriage and a single follower carriage are shown in Fig. 6, but many follower carriages, for example, four or five may be towed by the starter carriage. The electrical feed or live wire 80 extends throughout the train of carriages constituting the starting gate. The electrical connections between adjacent carriages is effected by use of a conventional multiple apertured socket 81 co-acting with a conventional multiple pin plug 82. The plug 82 is attached to a suitable length of flexible electrical cord wound upon a conventional spring-loaded cable reel 83, thereby permitting extensible and electrical contact between carriages.

The diagram of Fig. 6 presents all electrical individually operated gate closing switches, so that all the nettings of the leading boom may be lowered, and after the horses are lined-up and abreast each other behind this leading boom, the nettings of the second boom are then lowered as a unit and the handicapped horses assigned to this second linear boom are then lined-up behind it. This procedure is repeated for each linear boom of each carriage, until all the horses in the race are appropriately lined up behind their respectively assigned booms. The starter of the race can thus lower the nettings of each boom by energizing the corresponding gate closing switches. In Fig. 6 closing of the gate closing switch No. 1 lowers all the boom nettings on the linear boom attached to the starter carriage, whereas closing of the No. 2 gate closing switch lowers all the nettings on linear boom of the No. 2 carriage, i. e. the first follower carriage. Clearly No. 2 gate must therefore be electrically connected to the gate motor of the No. 2 carriage by wire 84, through intermediate suitable aperture and co-acting pin of socket 81 and plug 82. If a third carriage were added to the starting gate train, a third separate No. 3 gate closing switch must be installed in the starter carriage and led to the No. 3 carriage, passing through carriage No. 2 without electrical contact thereto.

In starting a race from a moving train of carriages, the starter at the time the lead boom is adjacent the starting point, trips the gate opening switch 85, and since switch 85 is in electrical contact with all the gate motors of all the carriages by wire 86, the motors are all simultaneously energized and lifted rapidly to their raised position to permit the running horses to pass thereunder.

The gate motors 20 are all provided with a spring loaded limit switch 87 of conventional usage to effect rotation of the rotatable rod 45 through 90 degrees. These limit switches 87 have a gate opening sub-switch and a gate closing sub-switch so that, for example, after the individual gates with their nettings are elevated 90 degrees, the moving gate trips one of the sub-switches thereby cutting-off the power and preventing further rotation. The same power cut-off procedure is effected when the gate is lowered to its vertical position whereupon the other of the two sub-switches of the limit switch 87 disposed to operate the respective rotatable rod 45 is energized and the power thereupon cut-off leaving the nettings of the respective linear boom in a vertical position.

Having read this broad inventive disclosure, those skilled in the art will now become aware of obvious changes that may be made. However, all such obvious changes are part of this invention and within the scope of the claims herein.

I claim:

1. A starting gate for handicap horse racing comprising of a plurality of linearly disposed wheeled carriages one behind another forming a train of cars having a lead car, a draw-bar secured linearly to each of said carriages and extending in front of and beyond each of said carriages, a selectively extensible sleeve and bar coupling disposed between adjacent carriages and secured to the respective draw-bar of the adjacent front carriage and the respective rear carriage, a selectively extensible boom of at least one boom segment secured to each of said carriages at the right angle relative to the longitudinal axis of the vehicle thereto and adapted to extend horizontally over a race course, a bar rotatably horizontally disposed on each of said boom segments and adapted to be removably coupled to a corresponding bar in an adjacent boom segment, a panel fixedly secured to each of said rotatable bars and having a retsraining netting fixedly secured thereto, motivating means for moving and controlling the speed of said string of cars, means for starting said motivating means located in the lead car of said string of cars, and means for rotating said bars of said boom segments located in said lead car.

2. The starting gate of claim 1 having a counterweight fixedly secured to each of said panels to facilitate rotation of said horizontally disposed rotatable bars whereby said paneled netting is rotated from an initial vertical position restraining forward movement of a race horse to a rotated horizontal position permitting said restrained race horse to pass thereunder.

References Cited in the file of this patent

UNITED STATES PATENTS

| 1,728,098 | Bork | Sept. 10, 1929 |
| 2,128,712 | Neff | Aug. 30, 1938 |
| 2,334,323 | Gilbert | Nov. 16, 1943 |
| 2,461,780 | Smith et al. | Feb. 15, 1949 |
| 2,510,828 | Mills | June 6, 1950 |
| 2,522,932 | Dressel | Sept. 19, 1950 |
| 2,526,060 | Ashton | Oct. 17, 1950 |
| 2,550,399 | Blake | Apr. 24, 1951 |
| 2,552,770 | D'Artenay | May 15, 1951 |
| 2,556,531 | Goodwin | June 12, 1951 |

FOREIGN PATENTS

| 308,036 | Great Britain | Mar. 21, 1929 |